(12) United States Patent
Parikh et al.

(10) Patent No.: US 12,003,833 B2
(45) Date of Patent: Jun. 4, 2024

(54) CREATING INTERACTIVE DIGITAL EXPERIENCES USING A REALTIME 3D RENDERING PLATFORM

(71) Applicant: Disney Enterprises, Inc., Burbank, CA (US)

(72) Inventors: Priyam S. Parikh, Marina del Rey, CA (US); Katharine S. Navarre, Sherman Oaks, CA (US); Andrew E. Wood, Los Angeles, CA (US); Evan A. Binder, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 40 days.

(21) Appl. No.: 17/725,648

(22) Filed: Apr. 21, 2022

(65) Prior Publication Data
US 2022/0345794 A1    Oct. 27, 2022

Related U.S. Application Data

(60) Provisional application No. 63/178,803, filed on Apr. 23, 2021.

(51) Int. Cl.
*H04N 5/445* (2011.01)
*H04N 21/845* (2011.01)
(Continued)

(52) U.S. Cl.
CPC ....... *H04N 21/8545* (2013.01); *H04N 21/845* (2013.01); *H04N 21/8541* (2013.01); *H04N 21/8106* (2013.01); *H04N 21/8146* (2013.01)

(58) Field of Classification Search
CPC ............. H04N 21/8545; H04N 21/845; H04N 21/8541; H04N 21/8106; H04N 21/8146;
(Continued)

(56) References Cited

U.S. PATENT DOCUMENTS 9,027,045 B2 *  5/2015  Hansen ............. H04N 21/2407
                                                725/10
10,623,831 B1 *  4/2020  Paul ..................... H04N 21/816
(Continued)

FOREIGN PATENT DOCUMENTS

WO    WO 98/41020    9/1998

OTHER PUBLICATIONS

Extended European Search Report dated Sep. 22, 2022 for EP Application 22169592.7.
(Continued)

*Primary Examiner* — Jefferey F Harold
*Assistant Examiner* — Sahar Aqil Riaz
(74) *Attorney, Agent, or Firm* — Farjami & Farjami LLP

(57) ABSTRACT

Certain aspects of the present disclosure provide techniques for creating interactive digital experiences for linear content. This includes identifying a plurality of assets relating to presentation of linear content. It further includes generating interactive content using the linear content, including generating an interactive sequence referencing one or more of the plurality of assets and combining the linear content with the interactive sequence on a timeline sequentially describing the linear content. The timeline includes one or more branches relating to the linear content, and selection of a first branch of the one or more branches is based on the interactive sequence. It further includes transmitting the interactive content to a user.

20 Claims, 7 Drawing Sheets

(51) Int. Cl.
*H04N 21/8541* (2011.01)
*H04N 21/8545* (2011.01)
*H04N 21/81* (2011.01)

(58) Field of Classification Search
CPC ......... H04N 21/2187; H04N 21/23412; H04N 21/236; H04N 21/2387; H04N 21/4781; H04N 21/816; H04N 21/8173; H04N 21/8547; H04N 21/23424
USPC .......................................................... 725/61
See application file for complete search history.

(56) References Cited

U.S. PATENT DOCUMENTS

| | | | |
|---|---|---|---|
| 10,924,823 B1 | 2/2021 | Binder et al. | |
| 2002/0188943 A1* | 12/2002 | Freeman | H04N 7/17318 348/E7.039 |
| 2003/0037664 A1* | 2/2003 | Comair | G10H 1/0025 84/609 |
| 2003/0193518 A1* | 10/2003 | Newnam | H04N 21/8547 348/E7.071 |
| 2009/0119736 A1* | 5/2009 | Perlman | A63F 13/355 725/133 |
| 2009/0327898 A1* | 12/2009 | Kim | G11B 27/034 707/999.1 |
| 2013/0094830 A1 | 4/2013 | Stone | |
| 2015/0139608 A1* | 5/2015 | Theobalt | G11B 27/28 386/241 |
| 2015/0294685 A1* | 10/2015 | Bloch | G11B 27/034 386/278 |
| 2015/0382042 A1* | 12/2015 | Wagenaar | H04N 21/25891 725/34 |
| 2016/0094875 A1* | 3/2016 | Peterson | H04N 21/4312 725/41 |
| 2016/0255387 A1* | 9/2016 | Yang | H04N 21/8545 725/32 |
| 2018/0359477 A1* | 12/2018 | Yang | H04N 19/136 |
| 2020/0366953 A1 | 11/2020 | Shushman | |
| 2021/0135772 A1* | 5/2021 | Brown | H04H 60/73 |
| 2022/0182738 A1* | 6/2022 | Sohn | A63F 13/53 |

OTHER PUBLICATIONS

European Patent Office, Extended European Search Report for Application 22169592.7-1208 dated Sep. 22, 2022.

* cited by examiner

CREATING INTERACTIVE DIGITAL EXPERIENCES USING A REALTIME 3D RENDERING PLATFORM

CROSS-REFERENCE TO RELATED APPLICATIONS

This application claims benefit of U.S. provisional patent application Ser. No. 63/178,803 filed Apr. 23, 2021. The aforementioned related patent application is herein incorporated by reference in its entirety.

BACKGROUND

Adding interactive elements to linear content (e.g., television programs or movies) is challenging. As discussed below, linear content is non-branching, and provides no interactivity, or very limited interactivity, and a limited user experience. Traditional video games, on the other hand, include interactive elements, but are typically implemented using state-machine or level loading techniques that may not preserve a content creator's directorial and creative intent. There is a need for a solution that efficiently combines the interactivity of video games with non-branching linear content, while preserving the linear content creator's directorial and creative intent.

SUMMARY

Embodiments include a method. The method includes identifying a plurality of assets relating to presentation of linear content. The method further includes generating interactive content using the linear content, including: generating an interactive sequence referencing one or more of the plurality of assets, and combining the linear content with the interactive sequence on a timeline sequentially describing the linear content. The timeline includes one or more branches relating to the linear content. Selection of a first branch of the one or more branches is based on the interactive sequence. The method further includes transmitting the interactive content to a user.

Embodiments further include a non-transitory computer-readable medium containing computer program code that, when executed by operation of one or more computer processors, performs operations. The operations include identifying a plurality of assets relating to presentation of linear content. The operations further include generating interactive content using the linear content, including: generating an interactive sequence referencing one or more of the plurality of assets, and combining the linear content with the interactive sequence on a timeline sequentially describing the linear content. The timeline includes one or more branches relating to the linear content. Selection of a first branch of the one or more branches is based on the interactive sequence. The operations further include transmitting the interactive content to a user.

Embodiments further include a system, including a computer processor, and a memory having instructions stored thereon which, when executed on the computer processor, performs operations. The operations include identifying a plurality of assets relating to presentation of linear content. The operations further include generating interactive content using the linear content, including: generating an interactive sequence referencing one or more of the plurality of assets, and combining the linear content with the interactive sequence on a timeline sequentially describing the linear content. The timeline includes one or more branches relating to the linear content. Selection of a first branch of the one or more branches is based on the interactive sequence. The operations further include transmitting the interactive content to a user.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
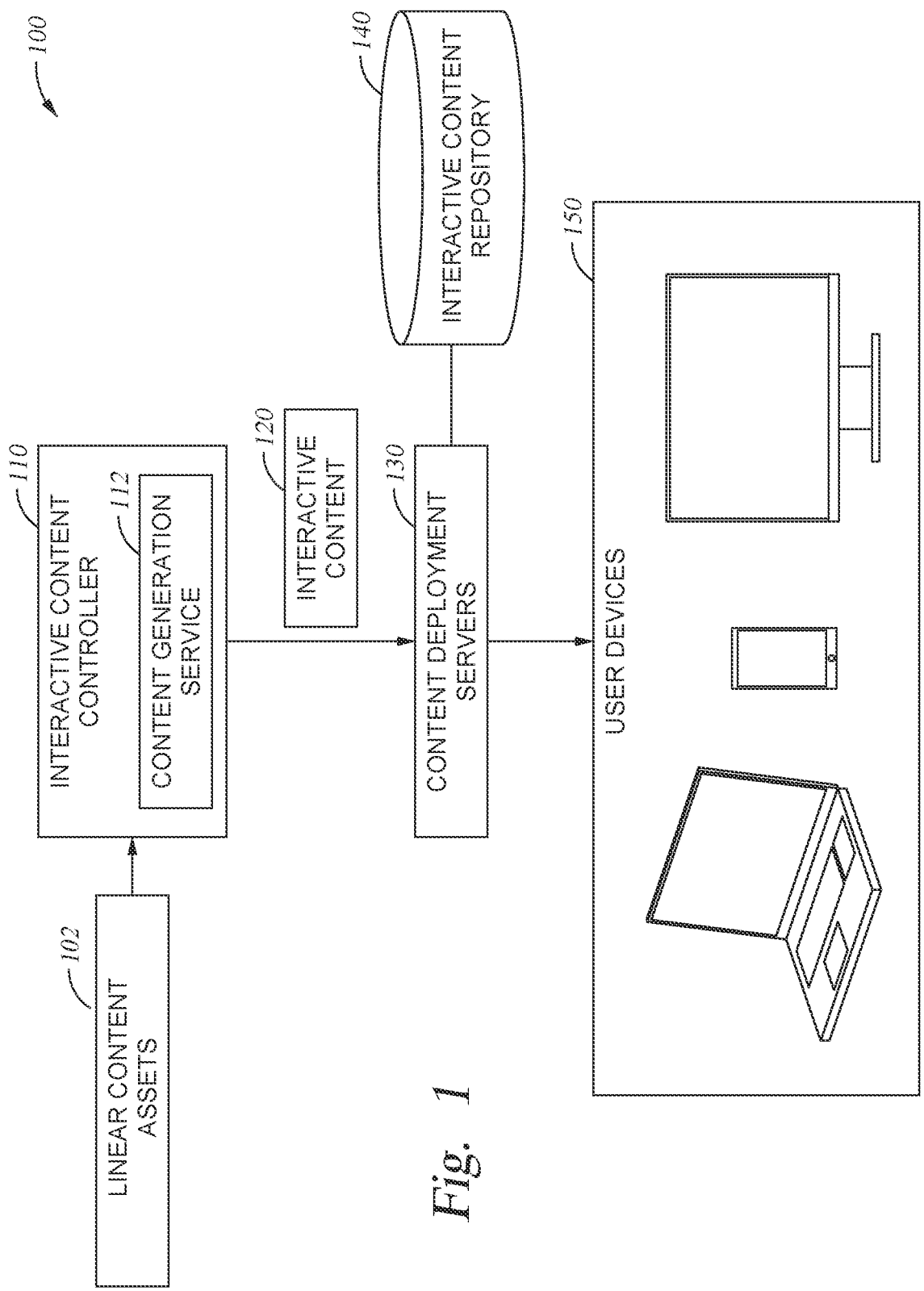
FIG. 1 illustrates a computing environment for creating interactive digital experiences for linear content, according to one embodiment.

Aspects of the present disclosure provide apparatuses, methods, processing systems, and computer-readable mediums for creating interactive digital experiences for linear content. As discussed herein, linear content is non-branching digital content for presentation to a user (e.g., a movie or television show). In an embodiment, pre-defined digital linear content assets can be combined with real-time generated content (e.g., content generated using a real-time gaming engine), to create an interactive experience that allows for continuous user engagement. For example, linear content can be combined with animation playbacks rendered in real-time through a game engine. Users can interact in real-time with the content at a time of their choosing, and can influence what is displayed on screen. The real-time rendering allows users to interact at any time with the content, and to see the results of the interaction immediately on screen, while still presenting to the user pre-defined assets generated for a piece of linear content (e.g., an episode, a short, or movie).

In an embodiment, pre-defined linear content assets can be combined with real-time generated content using a workflow that allows a content creator to seamlessly switch between linear real-time data and interactive events, producing a continuous user driven experience. This can be achieved, in an embodiment, by integrating a master linear timeline or real-time sequencer (e.g., Timeline from Unity™ Technologies, Sequence Editor from Unreal Engine™, or any other suitable technique) with an interactive state machine (e.g., an interactive state machine with sequential states). For example, a linear timeline (e.g., a master linear timeline) can be used, with state machine components layered on top of the existing timeline. Using this approach can, in an embodiment, enable a content creator to reference pre-defined linear content, activate and deactivate interactive abilities based on time, and append or insert branching content, all while preserving the directorial intent of the linear content.

In an embodiment, using a linear timeline allows the content creator's creative team to have strong, repeatable, control on data. For example, the creative team can control any suitable pre-defined linear content asset, including camera animation, audio, sound design, character animation, lighting, shading, modeling, other visual effects (VFX), or any other suitable asset. That is, in an embodiment, the content creator can reference, in the interactive element, any suitable asset from the linear content, and can pick and choose which assets to include.

Further, using the linear timeline allows the content creator to unhook desired objects from the linear timeline in order to make these objects user-interactive, and vice-versa. Use of a linear timeline can further allow the content creator to move to any point within the timeline based on any interactive event or combination of interactive events, without requiring a state machine or procedural implementation. For example, the content creator can move to a particular timestamp within the timeline, at any point and based on any user interaction or other trigger.

In an embodiment, one or more techniques described herein differ from traditional video game development, which relies on proceduralism (e.g., state machines) for interactive applications. For example, video game development can reference end frames or final frames of video in state machines. In video game development there is typically no linear timeline that progresses, independent of user inputs, and progression between scenes is state-dependent, rather than time-dependent. As such, in traditional video game development, scene changes typically appear as "hard cuts", as opposed to seamless transitions.

One or more techniques described herein differ from traditional video game development by referencing linear content assets (e.g., audio data, camera data, animation data, and other suitable assets) in real time. Using the linear timeline approach, and limiting use of proceduralism for interactive content, simultaneously allows user interaction at any point in the content, while also preserving the directorial intent of the content creator as to audio, camera, and animation. The creative team can easily play back and review any portion of the content (e.g., by scrubbing to a timecode), similar to working with a purely linear version of the project, while preserving interactivity. The content creator can flexibly add procedural cues that can be user activated, such as a user being able to execute shaders and camera movements, while still playing along the main sequence of content. For example the camera may be on a linear track, while additional animations such as one or more characters moving from one point to another may be provided as interactive logic.

Further, in an embodiment, the linear timeline approach described herein allows the interactive elements to reference the linear content (e.g., any suitable pre-defined assets of the linear content, as described below in relation to FIG. 1). This allows the linear and interactive aspects of the content to be developed in parallel, nondestructively. In this embodiment, upgrades made to the linear content assets (e.g., audio, camera, or animation) automatically update to the interactive content. This allows for rapid, and efficient, development of the content. This is discussed further, below, with regard to FIGS. 7A-7B.

In an embodiment, allowing the interactive elements to reference linear content assets further results in more efficient creation of interactive elements, resulting in reduced memory usage. For example, linear content assets can be mixed and matched in different combinations to create interactive elements for a user. Imagine a character in an interactive digital experience could have three assets, each with two possible states: 1) an animation showing the character as happy or sad, 2) a hat showing as either red or white, and 3) a background animation showing an explosion or no explosion. These three assets, with two possible states for each, could be used to generate eight possible interactive elements (i.e., [happy, red, explosion], [happy, red, no-explosion], [happy, white, explosion], [happy, white, no-explosion], [sad, red, explosion], [sad, red, no-explosion], [sad, white, explosion], or [sad, white, no-explosion]). In a prior solution, all eight of these interactive elements might be stored individually in memory for presentation to a user. Instead, by allowing the interactive elements to reference the linear content assets, only the three assets need to be stored in memory to generate the eight potential interactive elements. This greatly reduces memory usage, and increases the efficiency of creating interactive elements.

FIG. 1 illustrates a computing environment 100 for creating interactive digital experiences for linear content, according to one embodiment. In an embodiment, an interactive content controller 110 generates interactive content 120 using one or more linear content assets 102. The linear content assets 102 can include pre-defined assets used for linear content, including camera animation assets (e.g., virtual camera data or any other suitable camera animation assets), audio assets (e.g., audio files or any other suitable audio assets), sound design assets, animation assets (e.g., character animation, object animation, etc.), lighting assets, shading assets, modeling assets, VFX, or any other suitable assets.

For example, a content generation service 112 can generate the interactive content 120 using the linear content assets 102. The interactive content 120 can include references to the linear content assets 102, along with one or more interactive content elements. In an embodiment, the content generation service 112 generates the interactive content 120 by integrating a linear timeline or real-time sequencer with one or more interactive state machines. For example, the content generation service 112 can use a linear timeline, with state machine components layered on top of the timeline, to generate the interactive content 120 using the linear content assets 102. This is discussed further, below, with regard to FIGS. 3-5.

In an embodiment, the interactive content controller 110 provides the interactive content 120 to one or more content deployment servers 130 (hereinafter "content deployment servers 130"). For example, the interactive content 120 can be an executable. The executable can be generated by the interactive content controller 110 (e.g., using the content generation service 112), transmitted to the content deployment severs 130, and maintained at a suitable repository (e.g., the interactive content repository 140). In an embodiment, the content deployment servers 130, the interactive content repository 140, or both, are a suitable cloud computing infrastructure (e.g., a public cloud, a private cloud, a hybrid cloud, or any other suitable cloud computing infrastructure). Alternatively, or in addition, the content deployment servers 130, the interactive content repository 140, or both can be an on-premises compute infrastructure (e.g., a collection of on-premises servers) or any other suitable compute infrastructure.

In an embodiment, the interactive content 120 is provided to one or more user devices 150. In an embodiment, an interactive content executable (e.g., the interactive content 120) can play through the content deployment servers 130 (e.g., using a graphics processing unit (GPU)) and stream display content (e.g., pixel data) to one or more user devices 150 (hereinafter "user devices 150") using a suitable communication network. The user devices 150 can include any suitable computing device, including a smartphone, a tablet, a laptop computer, a desktop computer, a television (e.g., a smart television), a streaming player, a wearable device, a head-mounted display, or any other suitable computing device. In an embodiment, this allows for a fully interactive experience for users of the user devices 150, while only requiring a thin client with minimal processing and device capabilities (e.g., the main requirement is a fast network connection between the user devices 150 and the content deployment servers 130). This can offload the processing burden from the user devices 150 and allow for more flexibility in the creative implementation.

Alternatively, or in addition, an interactive content executable could be played on the user devices 150. For example, the user devices 150 could detect the local compute capabilities, and could elect remote or local execution based on these compute capabilities. User devices 150 with limited compute capabilities (e.g., with compute capabilities failing to meet a suitable threshold value), user devices 150 with fast network connections (e.g., with network capabilities meeting a suitable threshold value), or both, could receive streams of pixel data from an application executing on the content deployment servers 130, while more capable user devices 150, or user devices 150 with more limited network connections, could execute the application locally. In an embodiment, the interactive content executable can be provided to the user devices 150 using a communication network, through physical media (e.g., a suitable physical disk or drive), or using any other suitable technique. As another example, the interactive elements could be generated through a combination of execution on the client device and a remote server (e.g., some elements generated on the remote server and provided as pixel data and other elements generated locally).

Further, in an embodiment, the user devices 150 (or the content deployment servers 130) can decide whether to stream a fully linear version of the content or an interactive version of the content. For example, where a particular user device has a limited network connection and limited compute capabilities, the user device (or the content deployment server) could elect to stream the fully linear content. Where the user device has a sufficient network connection, or sufficient local compute abilities, the user device (or the content deployment server) could elect to execute and steam the interactive content. These techniques are described further in U.S. Pat. No. 10,924,823, which is herein incorporated by reference.

In an embodiment, any, or all, of the elements of the computing environment 100 (e.g., the linear content assets 102, the interactive content controller 110, the content deployment servers 130, the interactive content repository 140, and the user devices 150) are connected using one or more communication networks. For example, the elements of the computing environment 100 can interact using any combination of local area networks (LAN), wide area networks (WANs), the Internet, or any other suitable communication network. Further, the elements of the computing environment 100 can be connected to the communication network using any suitable network connection, including a wired connection (e.g., an Ethernet or fiber optic connection), a wireless connection (e.g., a WiFi connection), a cellular connection, or any other suitable network connection.

Figure 2:
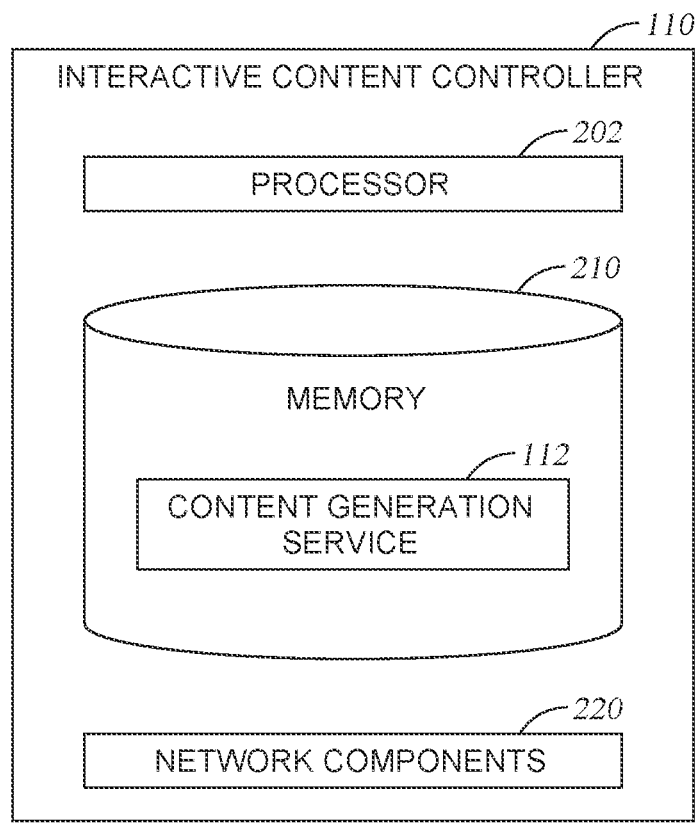
FIG. 2 illustrates a controller for creating interactive digital experiences for linear content, according to one embodiment.

FIG. 2 illustrates an interactive content controller 110 (e.g., as illustrated in FIG. 1) for creating interactive digital experiences for linear content, according to one embodiment. An interactive content controller 110 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the interactive content controller 110 to interface with a suitable communication network (e.g., a communication network interconnecting various components of the computing environment 100 illustrated in FIG. 1, or interconnecting the computing environment 100 with other computing systems). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the interactive content controller 110. The program code is generally described as various functional "applications" or "modules" within the memory 210, although alternate implementations may have different functions and/or combinations of functions. Within the memory 210, the content generation service 112 facilitates generating interactive content (e.g., generating interactive content using linear content assets by integrating a linear timeline or real-time sequencer with an interactive state machine). This is discussed further below with regard to FIG. 3.

While the interactive content controller 110 is illustrated as a single entity, in an embodiment, the various components can be implemented using any suitable combination of physical compute systems, cloud compute nodes and storage locations, or any other suitable implementation. For example, the interactive content controller 110 could be implemented using a server or cluster of servers. For example, one or more of the components of the interactive content controller 110 can be implemented using a public cloud, a private cloud, a hybrid cloud, or any other suitable implementation. Further, the interactive content controller 110 may include one or more computing platforms, such as computer servers for example, which may be co-located, or may form an interactively linked but distributed system, such as a cloud-based system.

Further, although FIG. 2 depicts the content generation service 112 as being located in the memory 210, that representation is also merely provided as an illustration for clarity. More generally, the interactive content controller 110 may include one or more computing platforms, such as computer servers for example, which may be co-located, or may form an interactively linked but distributed system, such as a cloud-based system. As a result, processor 202 and memory 210, may correspond to distributed processor and memory resources within the computing environment 100. Thus, it is to be understood that the content generation service 112 may be stored remotely within the distributed memory resources of the computing environment 100.

Figure 3:
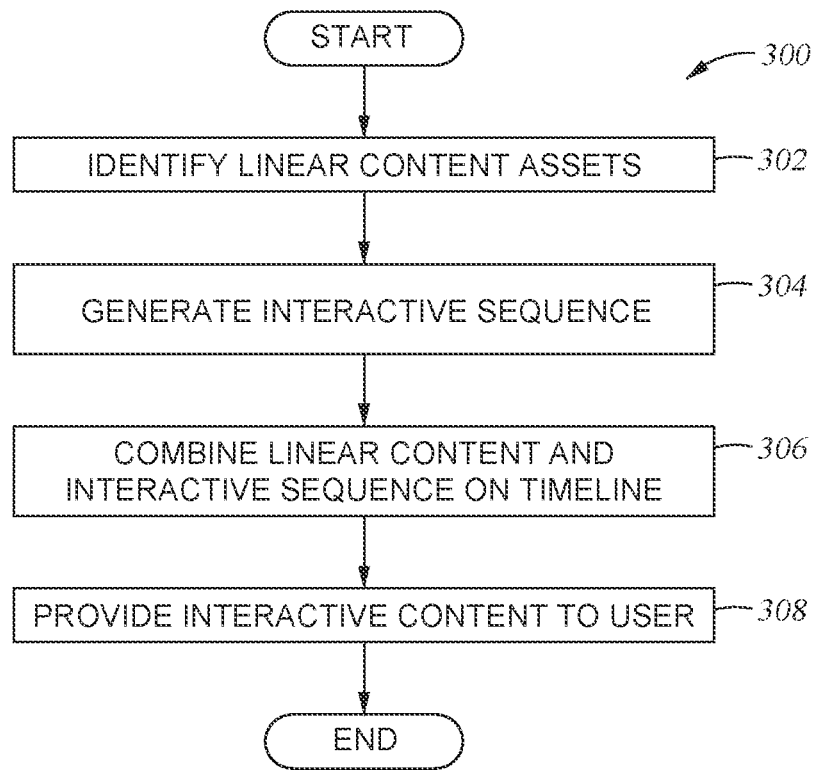
FIG. 3 is a flowchart illustrating creating interactive digital experiences for linear content, according to one embodiment.

FIG. 3 is a flowchart 300 illustrating a method for creating interactive digital experiences for linear content, according to one embodiment. At block 302 a content generation service (e.g., the content generation service 112 illustrated in FIGS. 1-2) identifies linear content assets. For example, as discussed above in relation to FIG. 1, the content generation service can receive linear content assets 102. In an embodiment, the linear content assets can include pre-defined assets used for linear content, including camera animation assets (e.g., virtual camera data or any other suitable camera animation assets), audio assets (e.g., audio files or any other suitable audio assets), sound design assets, animation assets (e.g., character animation, object animation, etc.), lighting assets, shading assets, modeling assets, VFX, or any other suitable assets.

At block 304, the content generation service generates one or more interactive sequences (e.g., through a combination of referencing the linear content assets and adding additional interactive logic). For example, the content generation service can generate interactive sequences with interactive logic that controls world space interactions and screen space interactions (e.g., in response to user input or other input). This is discussed further, below, in relation to FIG. 4. In an embodiment, the world space interactions can include passive abilities and active abilities, and both the world space interactions and screen space interactions can use interactive logic to control interactive moments and branched narratives in a linear timeline.

At block 306, the content generation service combines linear content and the interactive sequence on a timeline. For example, the content generation service can use a linear timeline to reference both interactive moments (e.g., described using a state machine) and linear content. This is discussed further below in relation to FIGS. 7A-7B. In an embodiment, the timeline can include a branched narrative (e.g., including twigging as discussed below in relation to FIG. 4). Further, in an embodiment, the combined timeline can reference both interactive content elements and linear content assets.

At block 308, the content generation service provides the interactive content to a user. For example, as discussed above in relation to FIG. 1, in an embodiment the content generation service generates an executable file including the interactive content (e.g., the interactive content 120 illustrated in FIG. 1). The executable file can be streamed from a suitable content deployment server (e.g., one or more of the content deployment servers 130 illustrated in FIG. 1) to a user device (e.g., one or more of the user devices 150 illustrated in FIG. 1) using a suitable communication network. Alternatively, or in addition, the executable file can be transferred to a user device (e.g., using the communication network) and played on the user device. These are merely examples, and any suitable technique can be used.

Figure 4:
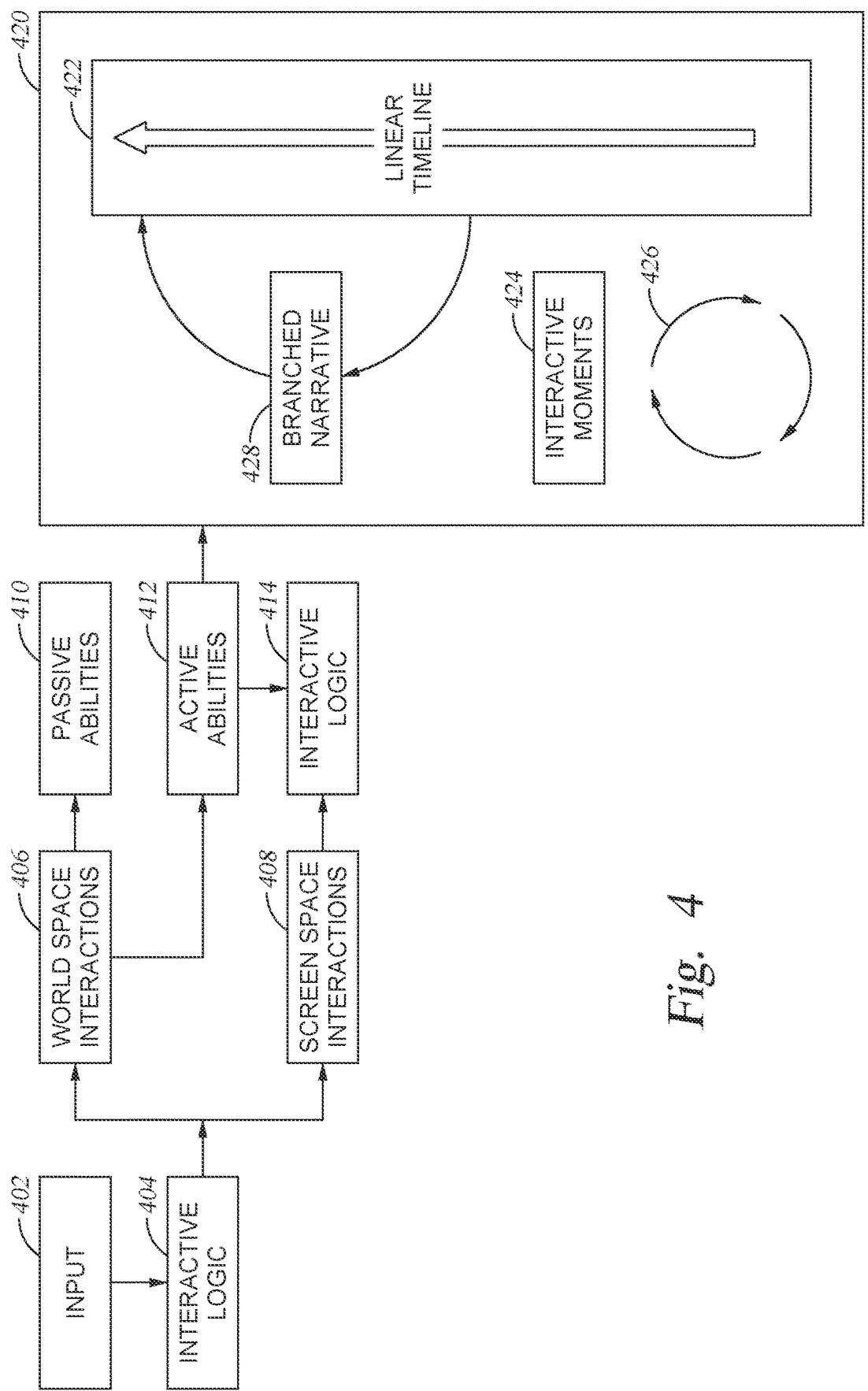
FIG. 4 is a block diagram illustrating a generated interactive digital experience for linear content, according to one embodiment.

FIG. 4 is a block diagram illustrating a generated interactive digital experience for linear content, according to one embodiment. In an embodiment, one or more inputs 402 trigger interactive logic 404. For example, the input 402 can include user input (e.g., as part of an interactive TV experience). Interactive TV is merely one embodiment, and any suitable content can be used. The user input can be a touch input, an input using an electronic device (e.g., a smartphone, a mouse or keyboard, a remote control), or any other suitable user input (e.g., a voice input or a visual input (e.g., facial captures or gesture recognition)). Further, the input 402 can include additional input beyond user input. For example, the input 402 can include passively collected data, including environment data (e.g., the weather, time of day, user device location, or any other suitable environment data). The input 402 can further include user device data (e.g., the orientation of the user device or the angle of the user device relative to a baseline, the type of user device, the size of the device display, or any other suitable device data. These are merely examples, and the input 402 can include any suitable input data.

In an embodiment, the interactive logic 404 allows for an interactive experience, based on the input 402. For example, the interactive logic 404 can provide for interactive elements accompanying linear content. Further, in an embodiment, the interactive logic can include multiple interactive aspects occurring simultaneously. For example, a character (e.g., a character in the linear content) and an object (e.g., an object in the linear content) could be available, simultaneously, for user interaction. Through the input 402, an end user could choose to interact with the character, the object, or both.

The interactive logic 404 may be tied to one or more world space interactions 406, screen space interactions 408, or both. In an embodiment, a world space interaction 406 is an interaction for the user within the content. For example, a user could control a character in the linear content to move around the screen, or interact with an object or another character in the virtual word. World space interactions 406 are discussed further, below, with regard to FIG. 5.

In an embodiment, by contrast, a screen space interaction 408 is a user interface interaction with the screen (e.g., a two dimensional interaction). For example, a user interface could include a button to allow for a user to bring up a menu or other item on screen. As another example, a user interface could include a trigger to bring up an interface to allow a user to scan their thumbprint to interact with the linear content. These are examples of a screen space interaction. In an embodiment, both world space interactions 406 and screen space interactions 408 can include quick time events (QTEs).

Returning to world space interactions 406, as discussed further below in relation to FIG. 5, a world space interaction can allow for a context sensitive interaction (e.g., a time sensitive interaction) between a user and the content. For example, in traditional video games, a world space interaction (e.g., a QTE) allows a user to perform an action (e.g., using a control device) shortly after the appearance of an on screen object (e.g., an instruction or prompt). A user might, for example, have a limited period of time (e.g., a few seconds) to interact after an instruction or prompt. QTEs are merely one example. Interactive logic can be tied to any suitable game element (e.g., a user could discover interactive logic through interaction with the game environment, without a QTE).

The world space interactions 406 can lead to one or more passive abilities 410 (e.g., passive interactive sequences), one or more active abilities 412 (e.g., active interactive sequences), or both. In an embodiment, the passive abilities 410 do not affect the linear timeline and linear content flow. For example, a user could be able to interact with an object on screen (e.g., highlighting the object, changing the objects color, moving the object on screen). This interaction would be visible to the user, but would not affect the larger storyline of the linear content. This is an example of a passive ability.

In an embodiment, active abilities 412 can affect the linear timeline and linear content flow. For example, an active ability can lead to a branch decision within the linear content. As one example, a user could control a character to make a decision relating to the linear content, or to take an action relating to the linear content. This decision or action could have an impact on the linear content storyline, and lead to a branch decision. This is an example of an active ability.

In an embodiment, active abilities 412 do not require direct user action. For example, the interactive logic 404 could include a counter or timer, tracking user input. If the user interacts sufficiently (e.g., provides sufficient user inputs within a given period of time), a linear timeline (e.g., the linear timeline 422 discussed further below) could branch to a more interactive portion (e.g., using the branched narrative 428 discussed further below). If the user does not interact sufficiently (e.g., provides no user input or fewer user input than is required to meet a threshold value) the linear timeline could branch to a less interactive portion. This allows users with more active input to receive an interactive experience tailored to their preferred experience, while allowing users who prefer a more passive experience to experience the linear content with less required interaction. In an embodiment, this is an example of an active ability because it affects the linear timeline (e.g., leads to a branch decision).

In an embodiment, both screen space interactions 408 and active abilities 412 lead to additional interactive logic 414. Both the screen space interactions 408 and active abilities 412 can affect the linear timeline and lead to branch decisions. As discussed below in relation to the linear timeline 422, the additional interactive logic 414 can govern these decisions.

FIG. 4 further includes structural elements 420. In an embodiment, a linear timeline 422 interacts with interactive moments 424. For example, the interactive moments 424 can be governed by one or more state machines 426. For example, the state machines 426 can describe a number of sequential states for the interactive moments 424 (e.g., with progression through the sequential states based on user interaction). In an embodiment, the interactive moments 424 (e.g., governed by the one or more state machines 426) occur in tandem with the linear timeline 422 progressing forward. As discussed above, these interactive moments 424 can be tied to a particular portion of the linear timeline 422, but the linear timeline 422 governs the larger experience. Further, as discussed above, multiple interactive moments can be available simultaneously (e.g., interactive moments associated with multiple characters on screen, multiple objects on screen, or a combination of characters and objects).

The linear timeline 422 further includes a branched narrative 428. In an embodiment, the branched narrative includes twigging. Twigging can, in an embodiment, allow for the linear timeline 422 to include multiple branches that lead to a limited number of endpoints. For example, the branched narrative 428 can include multiple branches that, depending on user interaction, return to the linear timeline 422 or lead to one of a limited number of endings. For example, the linear timeline 422 might include two possible endings. Twigging ensures that the branched narrative 428 includes multiple options for the user, but all options lead to one of the two available endings. In an embodiment, twigging provides for a more immersive user experience by effectively hiding the results of the user interaction.

Further, in an embodiment, the linear timeline 422 controls the user experience. For example, a user input (e.g., an input 402) can lead the content to move to a different portion of the linear timeline 422 (e.g., forward or backward along the timeline, or between branches in the timeline), depending on the interaction. The user experience is then governed by the new portion of the linear timeline 422.

Figure 5:
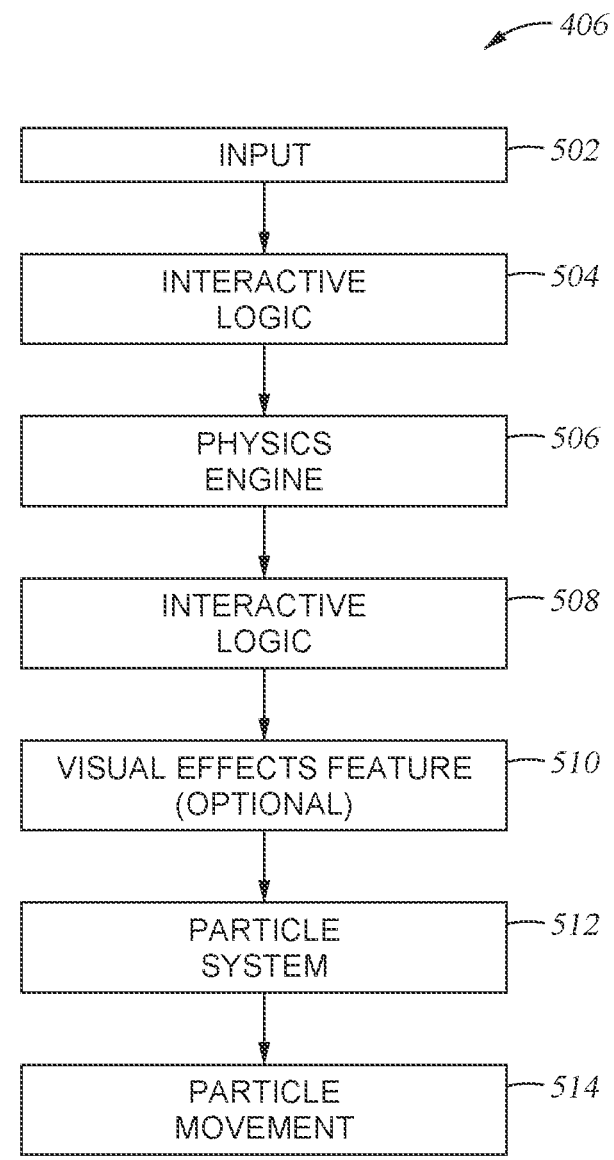
FIG. 5 further illustrates world space interaction for creating interactive digital experiences for linear content, according to one embodiment.

FIG. 5 further illustrates the use of world space interaction for creating interactive digital experiences for linear content, according to one embodiment. In an embodiment, FIG. 5 provides further detail for an example world space interaction 406 illustrated in FIG. 4. As discussed above in relation to FIG. 4, an input 502 (e.g., an input 402 illustrated in FIG. 4) leads to interactive logic 504 (e.g., the interactive logic 404 illustrated in FIG. 4). The interactive logic 504 leads to a physics engine 506.

In an embodiment, the physics engine 506 interacts with the interactive logic 504 to determine the outcome from the input 502 based on elements in the content (e.g., based on raycast collisions in the content). For example, a user could control a character in the content to interact with an object. The physics engine 506 is used to determine how the interaction between the character and the object impacts the digital experience (e.g., how it impacts the visual display and the linear timeline (e.g., the linear timeline 422 illustrated in FIG. 4)).

As one example, assume the interactive digital experience includes a vacuuming mechanic where a user attempts to quickly clean up a particle effect that appears on screen. In this example, a particle effect is displayed on screen (e.g., a cloud or group of particles). A user touches the screen at a location near the particles. If the user's touch is sufficiently close to the location the particles (e.g., within a threshold distance of the particles), the particles are channeled toward the point of the user's touch (e.g., the particles are shown on screen moving toward the user's touch). The look and feel of the particles, and other elements displayed on screen, react to the user's input. This is merely an example, and any suitable interactive logic 504 and physics engine 506 can be used.

In an embodiment, the physics engine 506 leads to additional interactive logic 508. In an embodiment, this interactive logic (e.g., the interactive logic 504, the interactive logic 508, or both) can further affect timeline branching. For example, as discussed above in relation to FIG. 4, the additional interactive logic 414 can affect the branched narrative 428 for the linear timeline 422. For example, continuing the vacuum example discussed above, a user touch sufficiently close to the particles (e.g., within the threshold as discussed above) cleans up (e.g., removes from the screen) some of the particles. If the user successfully cleans up enough of the particles, the interactive logic branches within the timeline. This is merely an example, and the initial interactive logic 504 can also affect timeline branching. For example, the input 502 can affect timeline branching (e.g., using the interactive logic 504).

Further, in an embodiment, the additional interactive logic 508 leads to a visual effects feature 510 (e.g., an animated character mesh). In an embodiment, animated character mesh is a visual effects feature that references character animations to display unique visual effects depending on character movement and user interactions. Following the vacuum example discussed above, the user touch of the screen could affect the character mesh of a character appearing on screen (e.g., bending the character mesh toward, or away from, the user's touch). This is merely one example of a visual effects feature 510. Further, the visual effects feature 510 is optional. As discussed below, the illustrated order of blocks in the flowcharts are merely examples, and are not limiting.

In an embodiment, the visual effects feature 510 leads to a particle system 512 that governs particle movement 514. For example, again continuing with the vacuum example discussed above, the particle system 512 can control visual display of the particles being cleaned up by the user's touch. Particles merely one example, and any suitable visual effect can be controlled or used. Further, in an embodiment, the particle system 512 and particle movement 514 can lead to another interactive logic. For example, this additional interactive logic (or any other suitable interactive logic) could control the speed at which the timeline progresses (e.g., half speed, double speed, etc.).

Figure 6:
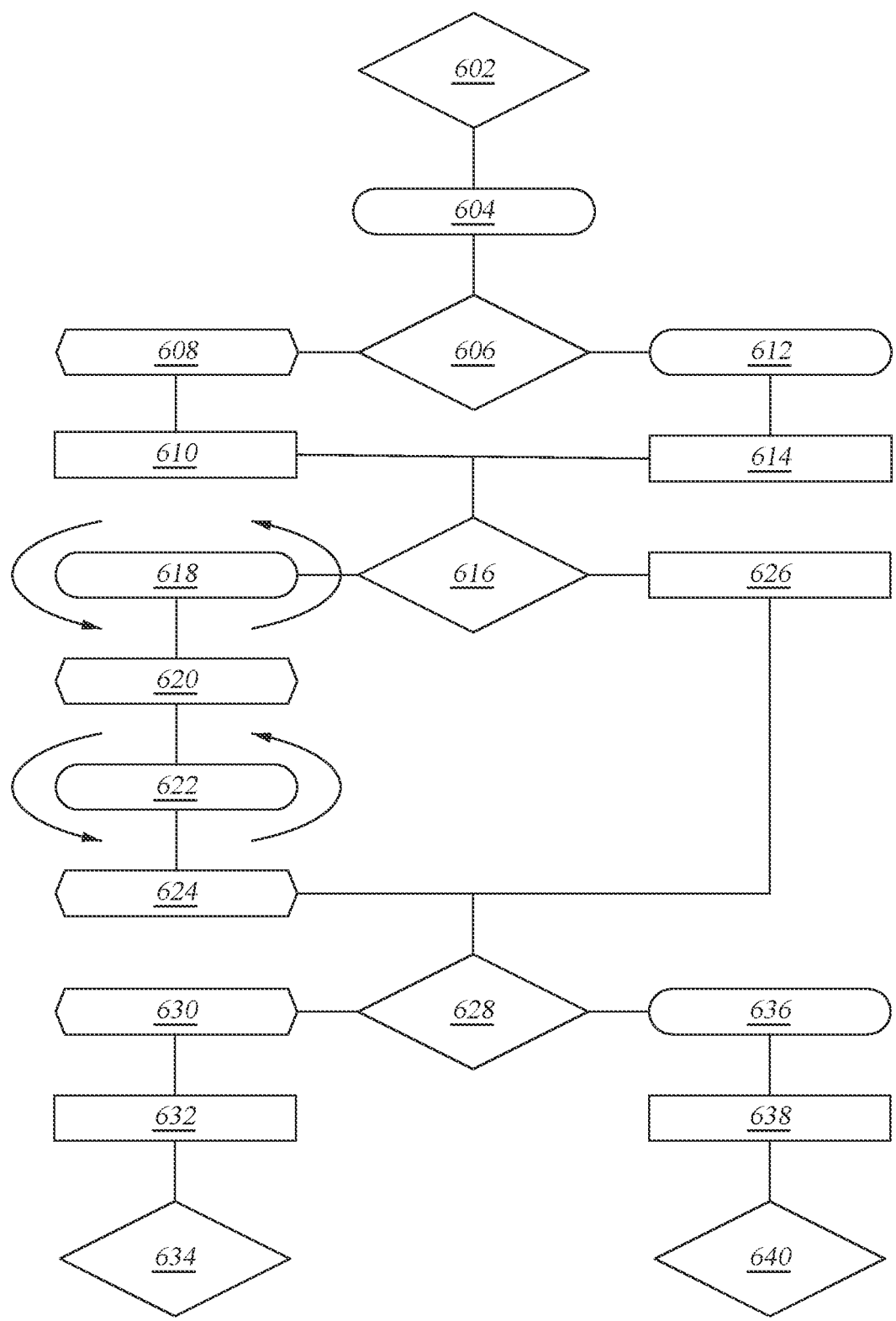
FIG. 6 is a flowchart illustrating a timeline for creating interactive digital experiences for linear content, according to one embodiment.

FIG. 6 is a flowchart illustrating a timeline for creating interactive digital experiences for linear content, according to one embodiment. In an embodiment the flow starts at linear, passive decision point 602. As discussed above, in an embodiment the passive decision point 602 may allow for user interaction (e.g., using passive abilities 410 illustrated in FIG. 4), but the user interaction does not affect the flow of the linear content (e.g., the flow continues to interactive sequence 604 regardless of the user interaction).

The flow then proceeds to interactive sequence 604. The interactive sequence 604, by contrast to the linear, passive decision point 602, allows for user interaction that can affect the linear flow (e.g., using an active ability 412 illustrated in FIG. 4). For example, the interactive sequence 604 leads to an interactive decision point 606. The interactive decision point 606 branches in two possible directions. This is merely one example, and an interactive decision point can lead to any suitable number of branches (e.g., more than two branches).

A first branch includes a linear sequence with interactive abilities 608 and a resulting passive sequence 610. In an embodiment the linear sequence with interactive abilities 608 is a sequence of linear content (e.g., non-branching content) in which the user can interact with the content without affecting the flow of the content. In an embodiment the passive sequence 610 is a passive sequence of linear content in which the user does not interact with the content.

A second branch includes another interactive sequence 612 and a resulting passive sequence 614. For example, the user's actions at the interactive sequence 604 impacts the branch taken at the interactive decision point 606, leading the flow to blocks 612 and 614 instead of blocks 608 and 610. In an embodiment the interactive sequence 612 provides for user interaction with the content, without affecting the flow of the content. In an embodiment, the passive sequence 614 (like the passive sequence 610 discussed above) is a passive sequence of linear content in which the user does not interact with the content.

The disparate paths recombine at the interactive decision point 616. As discussed above in relation to the branched narrative 428 illustrated in FIG. 4, this is an example of twigging. The interactive decision point 606 leads to two branches, each having different content, but the branches re-combine at the interactive decision point 616. For example, the linear sequence with interactive abilities 608 and resulting passive sequence 610 can provide different content to the user compared with the interactive sequence 612 and resulting passive sequence 614, but both eventually lead to the same interactive decision point 616.

The interactive decision point 616 then branches in two possible directions. This is again merely an example, and the interactive decision point 616 can branch in any suitable number of directions (e.g., more than two directions). A first branch includes an interactive sequence 618, a linear sequence with interactive abilities 620, another interactive sequence 622, and another linear sequence with interactive abilities 624. In an embodiment, the interactive sequence 618 and the interactive sequence 622 can each include state machines (e.g., the state machines 426 illustrated in FIG. 4) in which a user repeats the sequence until providing a particular interaction or reaching a goal. For example, the user can remain in the interactive sequence 618 while seeking to achieve a goal, and can then move to the linear sequence with interactive abilities 620. These are merely examples, and the interactive sequence 622 and linear sequence with interactive abilities 624 are optional and can be omitted. The flow could instead include only the interactive sequence 618 and linear sequence with interactive abilities 620, could include additional interactive sequences and linear sequences with interactive abilities, or could include any suitable content elements.

The second branch includes a passive sequence 626 (e.g., a sequence without user interaction, as discussed above) and avoids the interactive elements 618 and 622. For example, the interactive decision point 616 could include logic tracking a user's prior level of interactivity. If the user has reached a sufficient threshold of interactivity (e.g., a sufficient number of interactions in a given time period), then the user is sent to the branch with interactive elements 618 and 622. If the user has not reached a sufficient threshold of interactivity, the user is assumed to be interested in a more passive linear experience and is sent to the branch with the resulting passive sequence 626. The branches re-combine at the interactive decision point 628.

The interactive decision point 628 then leads to two branches. A first branch includes a linear sequence with passive abilities 630 and a passive sequence 632. This leads to a linear, passive decision point 634. A second branch includes an interactive sequence 636 and a passive sequence 638. This leads to a linear, passive decision point 640. In an embodiment, the linear passive decision points 634 and 640 represent alternative endings for the interactive content. This is merely an example, and the linear passive decision points 634 and 640 can represent any suitable content.

Figure 7A:
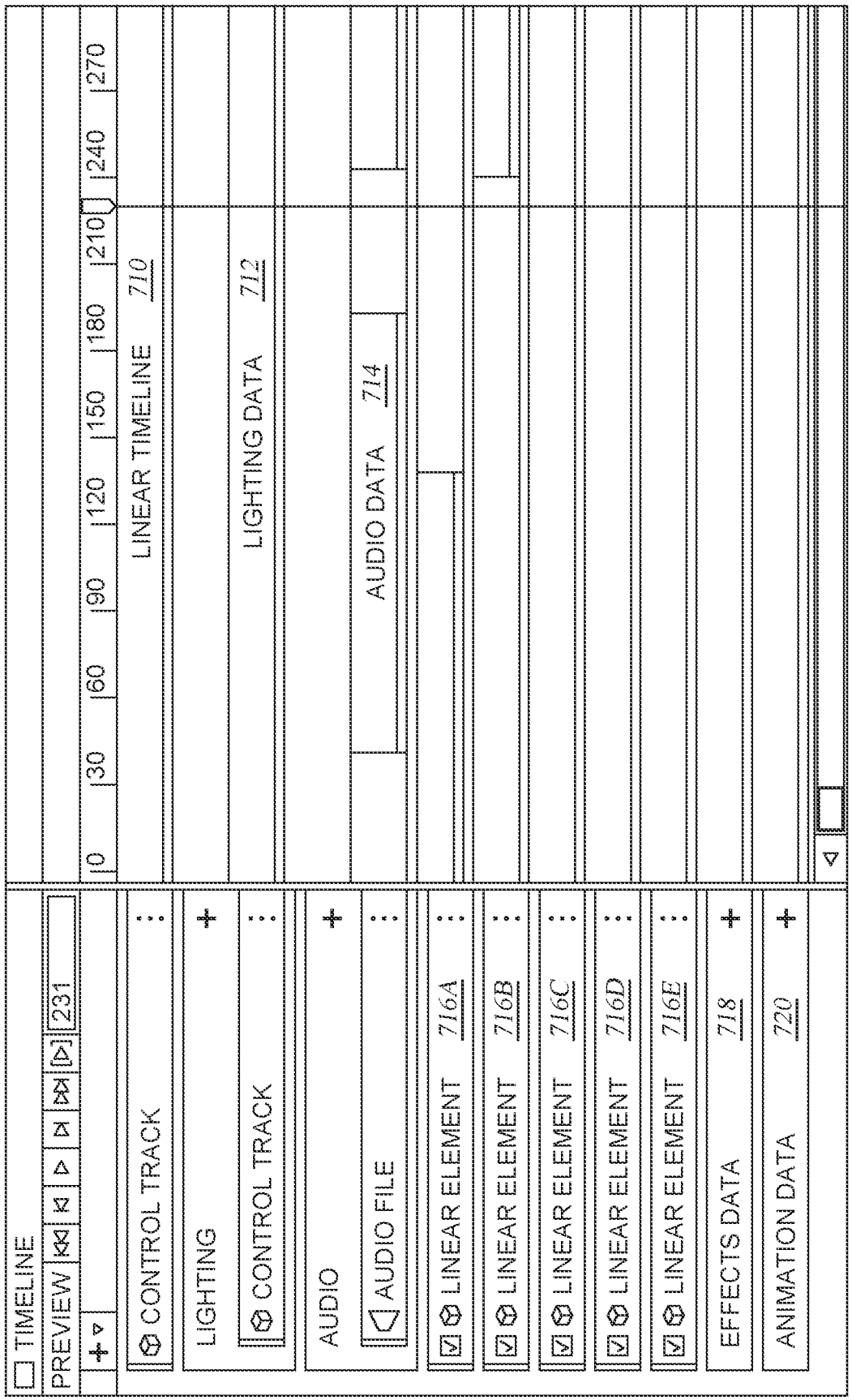
FIG. 7A illustrates referencing between linear and interactive timelines for creating interactive digital experiences for linear content, according to one embodiment.
Figure 7B:
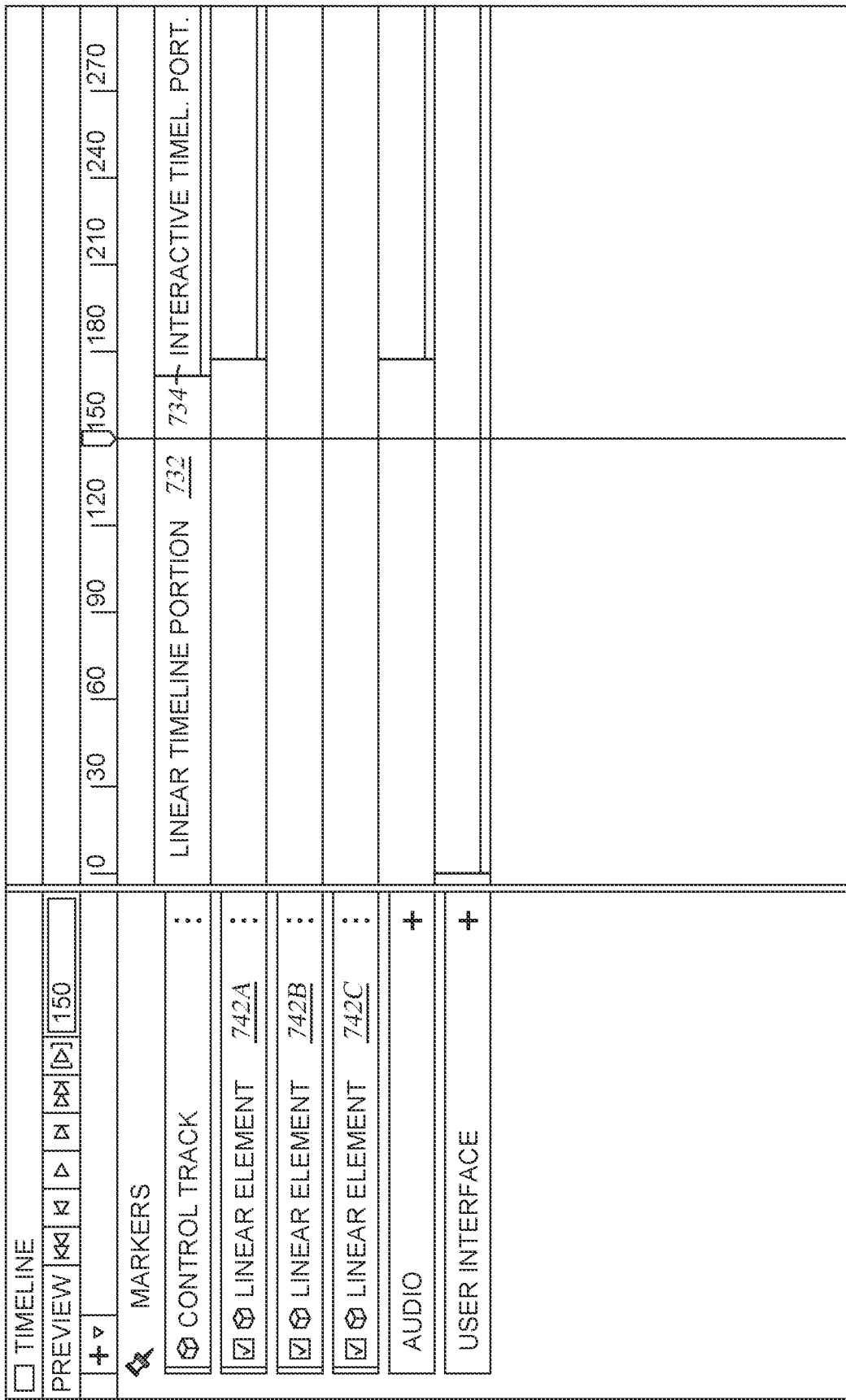
FIG. 7B further illustrates referencing between linear and interactive timelines for creating interactive digital experiences for linear content, according to one embodiment.

FIGS. 7A-7B illustrate referencing between linear and interactive timelines for creating interactive digital experiences for linear content, according to one embodiment. In an embodiment, an interactive timeline 730 illustrated in FIG. 7B references both a linear timeline portion 732 and an interactive timeline portion 734. For example, the linear timeline portion 732 illustrated in FIG. 7B can reference the linear timeline 710 illustrated in FIG. 7A. This allows the interactive timeline 730 to reference the linear content assets included in the linear timeline 710. These linear content assets in the linear timeline 710 can include lighting data 712, audio data 714, linear elements 716A-716E (e.g., titlecard data, heads up display (HUD) data, text data, or any other suitable linear elements), effects data 718, animation data 720, and any other suitable content assets.

In an embodiment, the interactive timeline 730 can reference these linear content assets from the linear timeline 710, so that any changes made to the linear content timeline 710 propagate to the interactive timeline 730. Further, the interactive timeline 730 can include interactive elements 742A-742C, for presentation during the interactive timeline portion. As discussed above, this ability to reference the linear timeline from the interactive timeline allows for parallel development of the linear timeline 710 and interactive timeline 730, greatly reducing development costs and potential errors.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   identifying a plurality of assets relating to presentation of linear content;
   generating interactive content using the linear content by:
   generating an interactive sequence referencing one or more of the plurality of assets, wherein the interactive sequence comprises a state machine including a plurality of sequential states, wherein progression through the plurality of sequential states is based on interactions with a user; and combining the linear content with the interactive sequence on a timeline sequentially describing the linear content,
wherein the timeline includes one or more branches relating to the linear content, and
wherein an input initiates a selection of a first branch of the one or more branches during the interactive sequence; and
transmitting the interactive content to the user.

2. The method of claim 1, wherein generating the interactive sequence referencing the one or more of the plurality of assets comprises at least one of: (i) directly referencing the one or more of the plurality of assets, or (ii) referencing a package relating to the one or more of the plurality of assets.

3. The method of claim 1, wherein the input initiating the selection of the first branch is a user input.

4. The method of claim 1, wherein the selection of the first branch comprises moving to a selected place in the timeline.

5. The method of claim 1, wherein generating the interactive sequence comprises controlling a passive ability, and wherein generating the interactive content further comprises generating an additional interactive sequence with interactive logic that controls an active ability relating to the linear content.

6. The method of claim 5, wherein controlling the passive ability comprises modifying a first display of at least a portion of the linear content for the user without affecting progression through the timeline, and wherein generating the additional interactive sequence comprises modifying a second display of at least a portion of the linear content for the user and affecting progression through the timeline.

7. The method of claim 1, wherein the linear content comprises at least one of a movie, an episode, or a short.

8. The method of claim 1, wherein the plurality of assets comprises at least one of camera animation, audio, sound design, character animation, lighting, shading, modeling, or visual effects (VFX).

9. The method of claim 1, wherein the timeline includes a plurality of branches relating to the linear content, the plurality of branches dependent on the interactive sequence.

10. The method of claim 1, wherein combining the linear content with the interactive sequence is performed using a workflow that allows for switching between linear real-time data and interactive events.

11. A non-transitory computer-readable medium containing computer program code that, when executed by operation of one or more computer processors, performs operations comprising:
generating interactive content using the linear content by:
generating an interactive sequence referencing one or more of the plurality of assets, wherein the interactive sequence comprises a state machine including a plurality of sequential states, wherein progression through the plurality of sequential states is based on interactions with a user; and
combining the linear content with the interactive sequence on a timeline sequentially describing the linear content,
wherein the timeline includes one or more branches relating to the linear content, and
wherein an input initiates a selection of a first branch of the one or more branches during the interactive sequence; and
transmitting the interactive content to the user.

12. The non-transitory computer-readable medium of claim 11, wherein the input initiating the selection of the first branch is a user input.

13. The non-transitory computer-readable medium of claim 11, wherein the selection of the first branch comprises moving to a selected place in the timeline.

14. The non-transitory computer-readable medium of claim 11, wherein generating the interactive sequence comprises controlling a passive ability, and wherein generating the interactive content further comprises generating an additional interactive sequence with interactive logic that controls an active ability relating to the linear content.

15. The non-transitory computer-readable medium of claim 14, wherein controlling the passive ability comprises modifying a first display of at least a portion of the linear content for the user without affecting progression through the timeline, and wherein generating the additional interactive sequence comprises modifying a second display of at least a portion of the linear content for the user and affecting progression through the timeline.

16. The non-transitory computer-readable medium of claim 11, wherein combining the linear content with the interactive sequence is performed using a workflow that allows for switching between linear real-time data and interactive events.

17. A system, comprising:
a computer processor; and
a memory having instructions stored thereon which, when executed on the computer processor, performs operations comprising:
identifying a plurality of assets relating to presentation of linear content;
generating interactive content using the linear content by:
generating an interactive sequence referencing one or more of the plurality of assets, wherein the interactive sequence comprises a state machine including a plurality of sequential states, wherein progression through the plurality of sequential states is based on interactions with a user; and
combining the linear content with the interactive sequence on a timeline sequentially describing the linear content,
wherein the timeline includes one or more branches relating to the linear content, and
wherein an input initiates a selection of a first branch of the one or more branches during the interactive sequence; and
transmitting the interactive content to the user.

18. The system of claim 17, wherein the input initiating the selection of the first branch is a user input.

19. The system of claim 17, wherein the selection of the first branch comprises moving to a selected place in the timeline.

20. The system of claim 17, wherein combining the linear content with the interactive sequence is performed using a workflow that allows for switching between linear real-time data and interactive events.

* * * * *